United States Patent
Bach

(10) Patent No.: US 9,097,892 B2
(45) Date of Patent: Aug. 4, 2015

(54) OPTICAL OBSERVATION DEVICE WITH AT LEAST ONE VISUAL OBSERVATION BEAM PATH

(75) Inventor: Christian Bach, Buseck (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 0 days.

(21) Appl. No.: 13/413,701

(22) Filed: Mar. 7, 2012
(Under 37 CFR 1.47)

(65) Prior Publication Data
US 2013/0077140 A1    Mar. 28, 2013

(30) Foreign Application Priority Data

Mar. 8, 2011 (DE) .......................... 10 2011 005 229

(51) Int. Cl.
| | |
|---|---|
| G02B 5/32 | (2006.01) |
| G02B 5/04 | (2006.01) |
| G02B 27/01 | (2006.01) |
| G02B 17/04 | (2006.01) |
| G02B 21/00 | (2006.01) |
| G02B 23/10 | (2006.01) |

(52) U.S. Cl.
CPC .............. *G02B 27/0103* (2013.01); *G02B 5/04* (2013.01); *G02B 5/32* (2013.01); *G02B 17/04* (2013.01); *G02B 21/00* (2013.01); *G02B 23/10* (2013.01)

(58) Field of Classification Search
None
See application file for complete search history.

(56) References Cited

U.S. PATENT DOCUMENTS

| | | | |
|---|---|---|---|
| 4,830,464 A | 5/1989 | Cheysson et al. | |
| 5,355,224 A | 10/1994 | Wallace | |
| 5,416,633 A | 5/1995 | Michel et al. | |
| 5,530,565 A | 6/1996 | Owen | |
| 5,835,263 A | 11/1998 | Dobschal | |
| 6,104,533 A | 8/2000 | Clark et al. | |
| 6,122,080 A | 9/2000 | Ogata | |
| 6,292,314 B1 | 9/2001 | Perger | |
| 6,914,726 B2* | 7/2005 | Kasai | 359/629 |
| 7,256,934 B2* | 8/2007 | Bihr et al. | 359/431 |
| 8,149,507 B2* | 4/2012 | Heintz et al. | 359/407 |
| 2002/0021498 A1 | 2/2002 | Ohtaka et al. | |
| 2002/0105737 A1* | 8/2002 | Takahashi et al. | 359/834 |
| 2005/0200965 A1 | 9/2005 | Staley, III et al. | |
| 2009/0174939 A1 | 7/2009 | Heintz et al. | |
| 2009/0303457 A1 | 12/2009 | Lancaster et al. | |
| 2010/0208341 A1 | 8/2010 | Dobschal et al. | |
| 2011/0016242 A1 | 1/2011 | Hara et al. | |
| 2011/0051117 A1 | 3/2011 | Pernstich et al. | |
| 2011/0128619 A1 | 6/2011 | Pernstich et al. | |

FOREIGN PATENT DOCUMENTS

| | | |
|---|---|---|
| DE | 692 22 261 T2 | 2/1989 |
| DE | 195 25 520 A1 | 1/1997 |

(Continued)

*Primary Examiner* — Jade R Chwasz
(74) *Attorney, Agent, or Firm* — Muirhead and Saturnelli, LLC

(57) ABSTRACT

An optical observation device with at least one visual observation beam path includes an objective lens, an eyepiece, an Abbe König prism system, a Porro prism system or a Schmidt Pechan prism system, arranged in the at least one visual observation beam path between the objective lens and the eyepiece, a display device for displaying an additional image in the visual observation beam path to the observer, and a device for image superposition, which has a holographic optical element, and which uses the holographic optical element to superpose onto the image of the display device the image of a target object to be observed in an intermediate image plane of the visual observation beam path. The prism system is provided with the at least one holographic element of the at least one device for image superposition.

20 Claims, 7 Drawing Sheets

(56) References Cited

FOREIGN PATENT DOCUMENTS

| | | |
|---|---|---|
| DE | 199 33 172 C1 | 1/2001 |
| DE | 10 2008 003 414 A1 | 7/2009 |
| DE | 10 2008 059 892 A1 | 6/2010 |
| EP | 2 085 746 A2 | 8/2009 |
| FR | 2 593 932 A1 | 8/1987 |
| WO | WO 00/16150 A1 | 3/2000 |

* cited by examiner

OPTICAL OBSERVATION DEVICE WITH AT LEAST ONE VISUAL OBSERVATION BEAM PATH

CROSS-REFERENCE TO RELATED APPLICATIONS

This application claims priority under 35 U.S.C. §119(a)-(d), to German Application No. 10 2011 005 229.1, filed Mar. 8, 2011.

FIELD OF THE INVENTION

The invention relates to an optical observation device with at least one visual observation beam path in accordance with the preamble of Claim 1.

In optical observation devices such as aiming optics, telescopes, microscopes or the like, it should be possible for information and/or data, flexible target markers etc. to be displayed or superposed for the user. Different superposition and/or inward reflection concepts are known from practice for this purpose. Such optical inward reflection methods should substantially fulfill the following boundary conditions. The transmittance for the main light and/or the observation light of the optical observation device should be as high as possible (for example, greater than 95%). Moreover, the required physical space for an appropriate inward reflection module should be adapted to the physical space of the optical observation device, and/or be small.

The approach in previous solutions has mostly been to use a beam splitter that is regularly integrated in a prism inverting system to couple light into the observation beam path from a display device for displaying a distance or for inward reflecting a target marker. As a result, the transmission of the entire observation beam path is tangibly reduced and, moreover, color distortions can occur when the splitter ratio of the beam splitter depends on the wavelength of the light. Such known solutions frequently require a greater space than the actual basic prism system.

DE 195 25 520 C2 describes how images are coupled into beam paths of microscopes by means of diffractive optical elements, in particular reflection gratings and transmission gratings. The diffractive optical elements described there have no imaging effect. The imaging effect is attained by further optical elements.

DE 692 22 261 T2 relates to sighting devices and, in particular, devices that enable an image formed, for example, by the image of a natural landscape, to be superposed by a second image that, for example, consists of symbolic elements—geographic or other symbols, by way of example.

DE 10 2008 003 414 A1 specifies binoculars with two tubes in which there is respectively arranged an Abbe König prism system for image in version of a respective visual observation beam path, the respective Abbe König prism system consisting of an isosceles prism and a roof prism adjacent thereto.

As regards the further prior art, reference is made to WO 00/16150, U.S. Pat. No. 5,355,224 and U.S. Pat. No. 6,914,726 B2.

SUMMARY OF THE INVENTION

Starting therefrom, it is the object of the present invention to improve an optical observation device of the type mentioned at the beginning, the aim, in particular, being to achieve a lesser demand on physical space for the inward reflection module, as well as a high transmission of the observation beam path.

This object is achieved according to the invention by an optical observation device having the features named in Claim 1.

Owing to the fact that the Abbe König prism system, the Porro prism system or the Schmidt Pechan prism system is provided with the at least one holographic optical element of the at least one device for image superposition, a beam splitter and an imaging optics which may be necessary are advantageously combined in a hologram that can be introduced at a suitable point in the prism system. In this case, the hologram ensures that an, in particular monochromatic, display is coupled in and, optionally, that the image of the display is additionally imaged in the observation beam path. This reduces the requisite physical space substantially and simplifies installation. Owing to the narrow bandwidth of the coupling in, particularly in a region of less than 100 nm, in particular less than 50 nm, preferably less than 20 nm, the transmission of the residual wavelengths in the observation beam path is only slightly disturbed, and the total transmission of the visual observation beam path becomes much higher than in the case of the known solutions.

The holographic optical element can effect a deflection of the light, which is to be superposed, of the image of the display device in the at least one visual observation beam path.

It is advantageous when the holographic optical element additionally effects an imaging, a collimation and/or a wavelength selection of the light, which is to be superposed, of the display device.

The integration and/or combination of the different optical elements with their effects in a hologram reduces the requisite physical space and substantially simplifies installation. The basis for the hologram is provided by an optics consisting, at least, of a first prism, an optional collimator that images the display onto an image plane and an optional further prism that can determine the installation angle of the display. The first prism should have an angle such that, were the prism cemented on the face of the inverting prism system, light can be incident in the prism system from the display. If required, it would, of course, be possible for yet further optical elements to be integrated, for example in order to enlarge or reduce the imaging.

The holographic optical element can be designed to be a transmitting element, in particular a transmission diffraction grating.

It is advantageous when the holographic optical element is applied as a holographic layer to a face of the Abbe König prism system, of the Porro prism system or of the Schmidt Pechan prism system.

The required physical space can be yet further reduced by these measures. With the aid of computer generation, in particular, it is possible by directly exposing a photosensitive layer, for example silver salt, for the holographic layer to be applied directly to the prism face by laser engraving, or as a plastic pressed hologram. The holographic layer can also be produced in another generally known technique for holographic fabrication.

In this case, a face of a roof prism, or a face of an isosceles prism of the Abbe König prism system or a face of a roof prism, or a face of a further prism of the Schmidt Pechan prism system can be provided with the holographic layer. According to the invention, it can further be provided that the face is a light entrance face of the roof prism or of the isosceles prism of the Abbe König prism system, or of the roof prism or of the further prism of the Schmidt Pechan prism system for the observation light.

Likewise, a face of a first prism or a face of a second prism of the Porro prism system can be provided with the holographic layer. The face can be a light entrance face or a light exit face of the first prism or of the second prism of the Porro prism system for the observation light.

Abbe König prism systems, Porro prism systems and Schmidt Pechan prism systems usually respectively consist of exactly two prisms. However, it is also possible to add further prisms.

The optical observation device can be designed, for example, as binoculars, a telescope, an aiming optics or a microscope.

BRIEF DESCRIPTION OF THE DRAWINGS

Advantageous refinements and developments of the invention follow from the subclaims. Exemplary embodiments of the invention are specified in principle below with the aid of the drawing, in which:

DETAILED DESCRIPTION OF THE INVENTION

The invention is explained below with the aid of a telescope as the optical observation device. However, it can also be used with the appropriate modifications for any other desired optical observation devices.

Functionally identical elements in the different embodiments of the inventive optical observation device are provided below with the same reference symbols.

Figure 1:
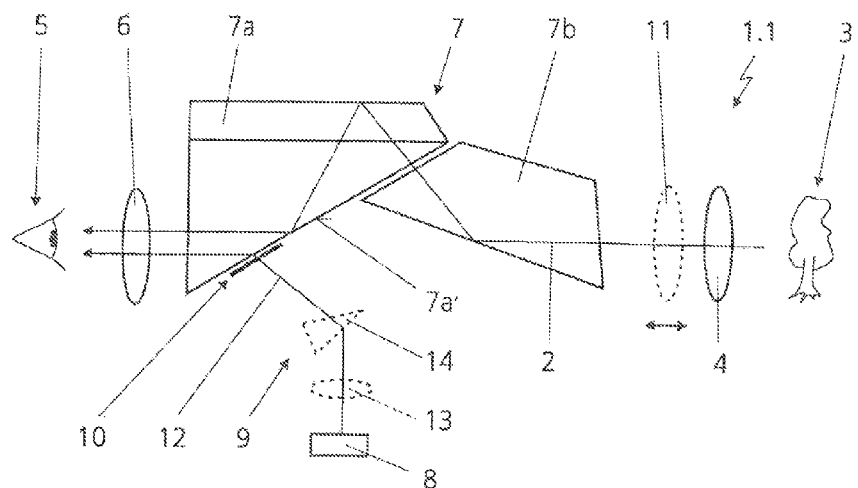
FIG. 1 shows a schematic of a first embodiment of an inventive optical observation device.

FIG. 1 illustrates an inventive optical observation device 1.1 in a first embodiment with a visual observation beam path 2 which has an objective lens 4, that is to be turned in an operating position to a target object 3 to be observed and images the target object 3, and an eyepiece 6 that is to be turned to an eye 5 of an observer. An Abbe König prism system 7 for imaging version image inversion of the visual observation beam path 2 is arranged in the visual observation beam path 2 between the objective lens 4 and the eyepiece 6.

The Abbe König prism system 7 has a roof prism 7a and an isosceles prism 7b. As regards further details of the Abbe König prism system 7, reference is made to DE 10 2008 003 414 A1 quoted at the beginning, which likewise discloses binoculars with an Abbe König prism system. For reasons of space, in particular, the roof prism 7a is frequently arranged in the direction of the eyepiece 6 in the visual observation beam path 2. In addition, the roof prism 7a is then located closer to the eye 5 of the observer so that—should the roof prism 7a be defective the optical errors produced are not perceived by the eye 5, or are not so strongly perceived.

Further provided are a display device 8, intended for displaying an additional image in the visual beam path to the observer 5, and a device 9 for image superposition that has an, in particular, diffractive, holographic optical element 10 that it uses to superpose onto the image of the display device 8 the image of the target object 3 to be observed in an intermediate image plane of the visual observation beam path 2. As may further be seen from FIG. 1, the Abbe König prism system 7 is provided with the holographic optical element 10 of the device 9 for image superposition.

The optical observation device 1 can optionally have a movable focus unit 11 (indicated by dashes).

The holographic optical element 10 effects a deflection of the light 12, which is to be superposed, of the image of the display device 8 into the visual observation beam path 2. The device 9 can optionally have an imaging optics or imaging lens 13 (indicated by dashes) that can also serve as a collimator and projects the image of the display device 8 into a prescribed image plane, and an optional further prism 14 corresponding to a required image deflection for the purpose of selecting the installation position of the display device 8.

Alternatively, as in the present exemplary embodiment the holographic optical element 10 can additionally effect an imaging, a collimation and a wavelength selection of the light 12, which is to be superposed, of the display device 8.

It follows that the basis for the holographic optical element 10 or hologram is an optics 24 consisting of a prism 24a (see FIG. 12), an optional imaging lens or collimator lens 13, 24b, which images the display device 8 into an intermediate plane, and an optional further prism 14, 24c that takes account of the installation angle of the display device 8. The prism 24a should have an angle such that light from the display device 8 can be incident in the Abbe König prism system 7.

The display device 8 can be designed in any way desired, preferably monochromatically. Consideration is given, for example, to LED multisegment displays (for numbers and symbols), LED matrix displays (for desired graphics), LCD displays backlit by means of lasers or LEDs, or else individual points that are illuminated by means of LEDs or lasers (for example in order to display target markers).

The image of the display device 8 appears to be superposed on the observed image, and can therefore be read off by the user through the eyepiece 6.

The holographic optical element 10 is designed to be a transmitting element, preferably a transmission diffraction grating. The holographic optical element is applied as a holographic layer 10 directly onto a face 7a' of the roof prism 7a of the Abbe König prism system 7 (illustrated in simplified fashion). The intermediate image plane for image superposition can thus be seen in a simplified fashion in the face 7a' of the roof prism 7a, or in the corresponding faces 7b',7a'',7b'', 15a',15a'',15a''' of the further embodiments, described below, of the inventive optical observation device 1.1 to 1.11.

Figure 2:
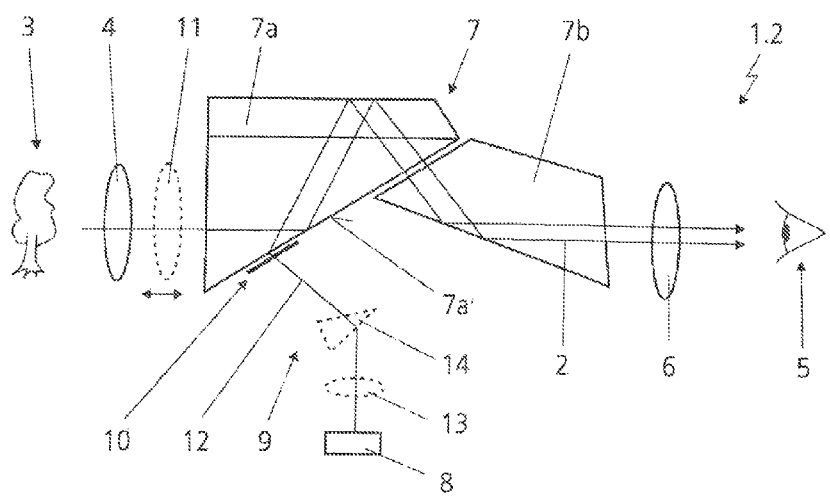
FIG. 2 shows a schematic of a second embodiment of an inventive optical observation device.

A second embodiment of an inventive optical observation device 1.2 is illustrated in FIG. 2. Here, the Abbe König prism system 7 is arranged inverted in the optical observation device 1.2, that is to say that the roof prism 7a is not turned to the eye 5 of the observer, but to the objective lens 4 or the target object 3.

The holographic layer 10 can be applied directly to the face 7a' of the roof prism 7a by direct exposure of a photosensitive layer such as, for example, silver salt. Furthermore, it is possible to introduce the holographic layer 10 into the face 7a' of the roof prism 7a as a laser engraving. The holographic layer 10 can also be produced as a plastic pressed hologram or in another, generally known technique for holographic fabrication.

Figure 3:
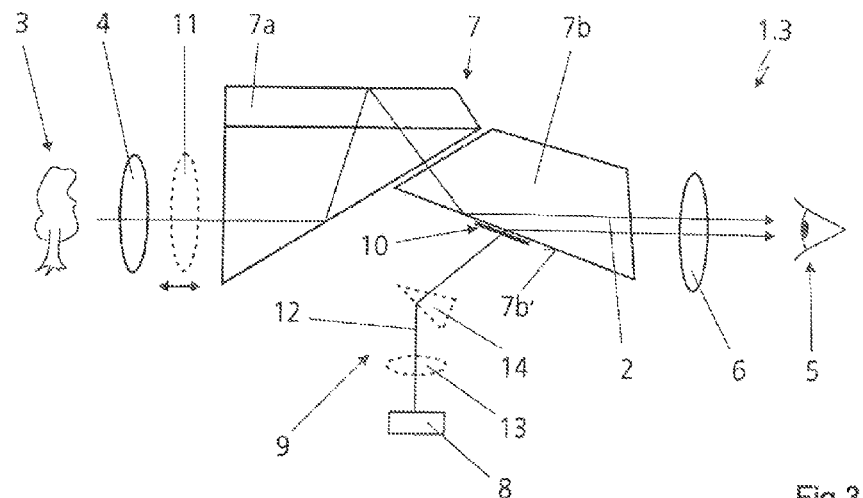
FIG. 3 shows a schematic of a third embodiment of an inventive optical observation device.

FIG. 3 illustrates a third embodiment of an inventive optical observation device 1.3. The holographic layer 10 is applied in this case to a face 7b' of the isosceles prism 7b of the Abbe König prism system 7.

Figure 4:
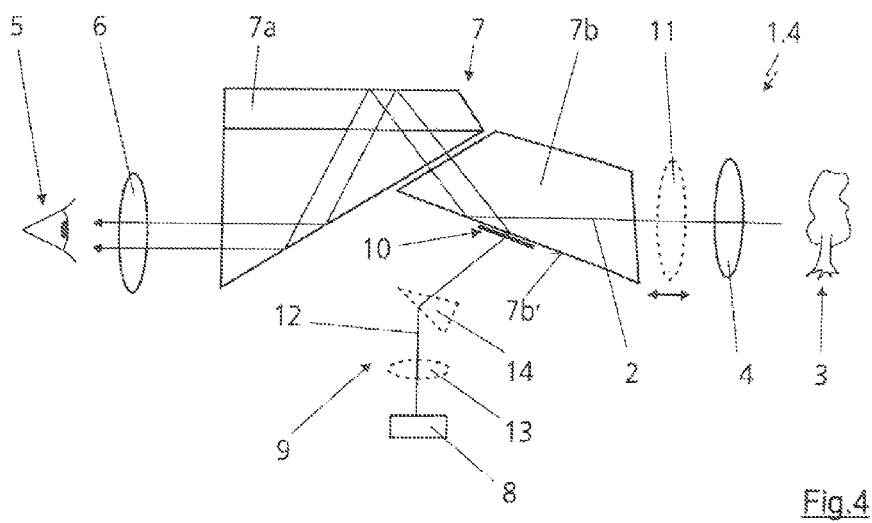
FIG. 4 shows a schematic of a fourth embodiment of an inventive optical observation device.

FIG. 4 shows a fourth embodiment of an inventive optical observation device 1.4. By contrast with the third embodiment of the inventive optical observation device 1.3 from FIG. 3, in this case it is only the Abbe König prism system 7 that is arranged in an inverted fashion, and so the roof prism 7a is turned to the eye 5 of the observer.

Figure 5:
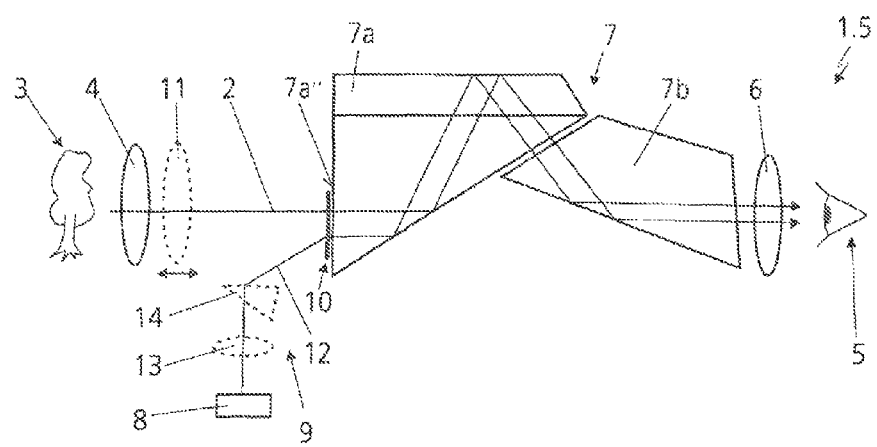
FIG. 5 shows a schematic of a fifth embodiment of an inventive optical observation device.

FIG. 5 shows a fifth embodiment of an inventive observation device 1.5. Here, a light entrance face 7a" of the roof prism 7a for the observation light is provided with the holographic layer 10.

Figure 6:
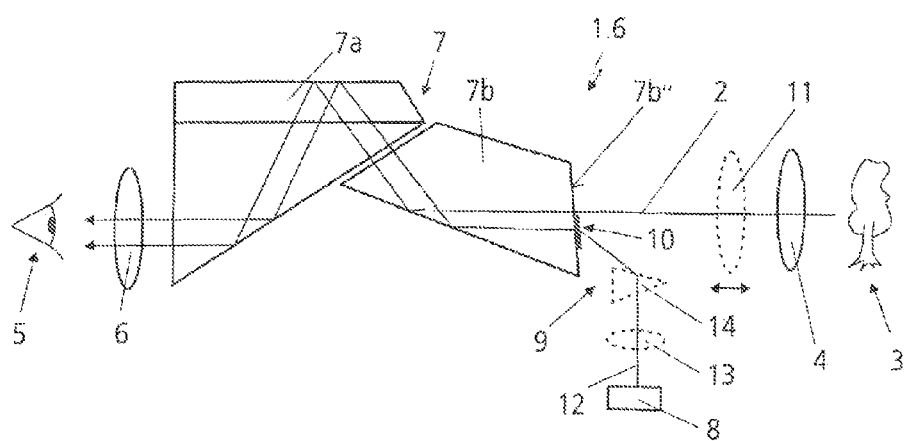
FIG. 6 shows a schematic of a sixth embodiment of an inventive optical observation device.

By contrast therewith, FIG. 6 illustrates a sixth embodiment of an inventive optical observation device 1.6, in the case of which a light entrance face 7b" of the isosceles prism 7b for the observation light is provided with the holographic layer 10.

Figure 7:
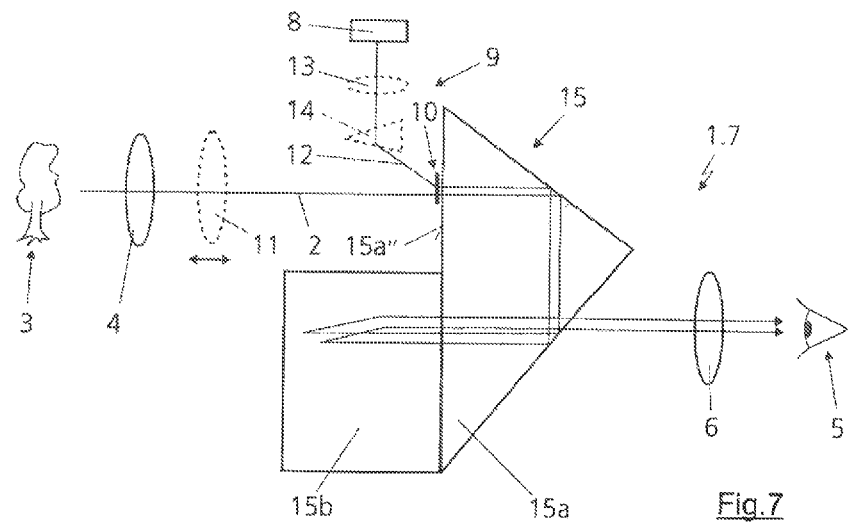
FIG. 7 shows a schematic of a seventh embodiment of an inventive optical observation device.

A seventh embodiment of an inventive optical observation device 1.7 is illustrated in FIG. 7. In this case, a Porro prism system 15 with a first prism 15a and a second prism 15b is provided as an inverted system. The Porro prism system 15 is provided with the holographic optical element 10 of the device 9 for image superposition. The holographic optical element is applied as a holographic layer 10 to a face, in particular a light entrance face 15a" of the first prism 15a for the observation light.

Figure 8:
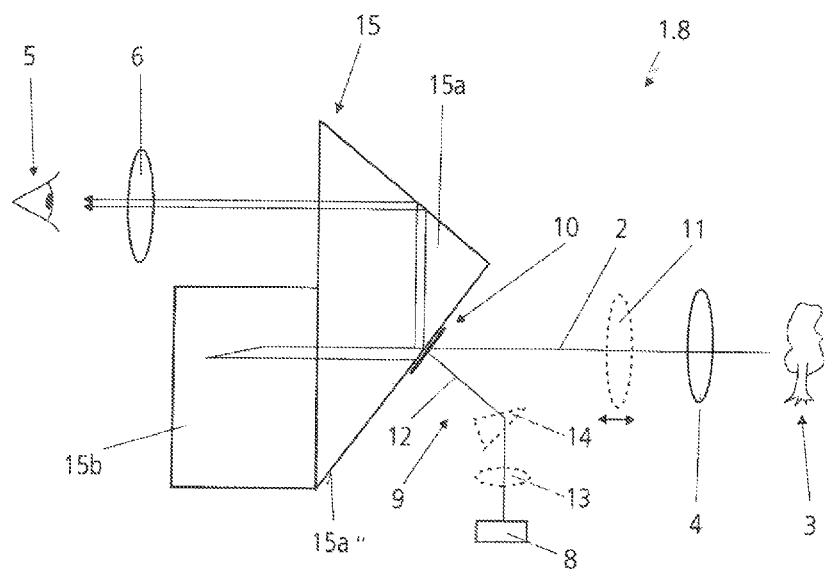
FIG. 8 shows a schematic of a eighth embodiment of an inventive optical observation device.

FIG. 8 shows an eighth embodiment of an inventive optical observation device 1.8, in the case of which, by contrast with the embodiment in accordance with FIG. 7, the Porro prism system 15 is arranged in a rotated fashion. In this case, the light entrance face 15a" of the first prism of the Porro prism system 15 for the observation light is again provided with the holographic layer 10.

Figure 9:
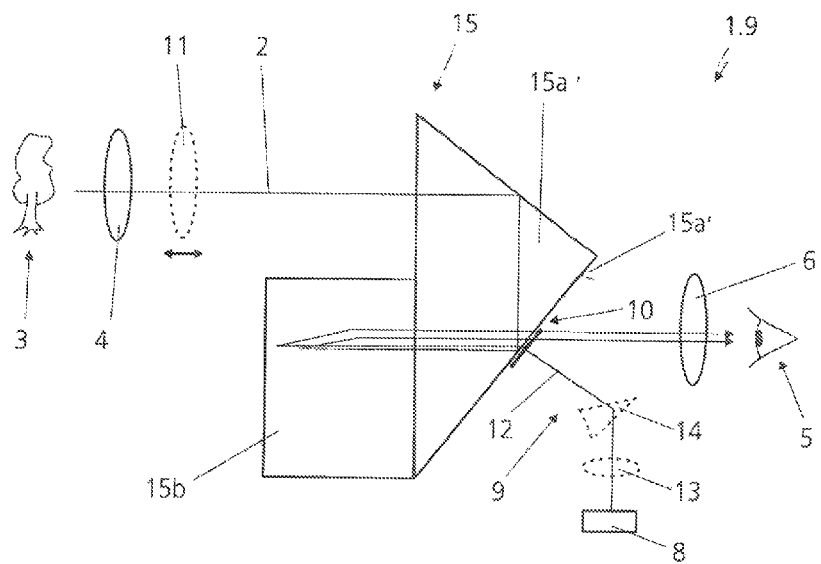
FIG. 9 shows a schematic of a ninth embodiment of an inventive optical observation device.

FIG. 9 shows a ninth embodiment of the inventive optical observation device 1.9 in the case of which a light exit face 15a' of the first prism 15a for the observation light is provided with the holographic layer 10.

Figure 10:
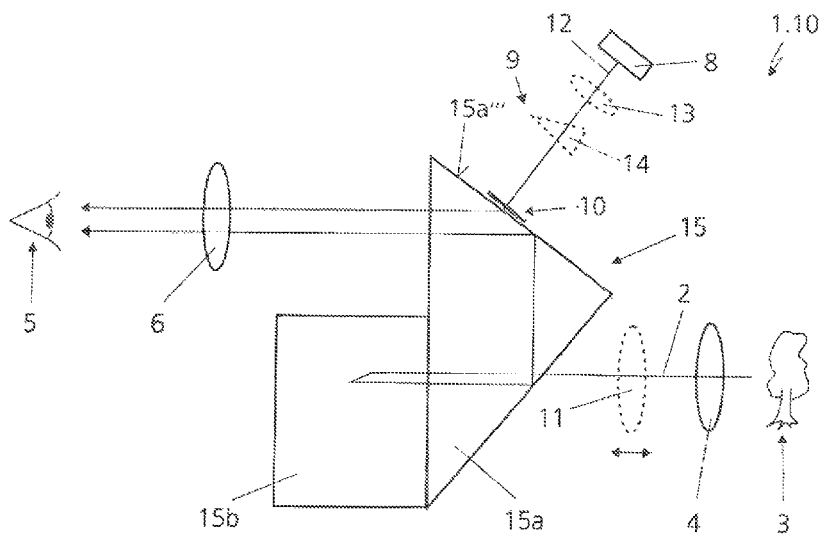
FIG. 10 shows a schematic of a tenth embodiment of an inventive optical observation device.
Figure 11:
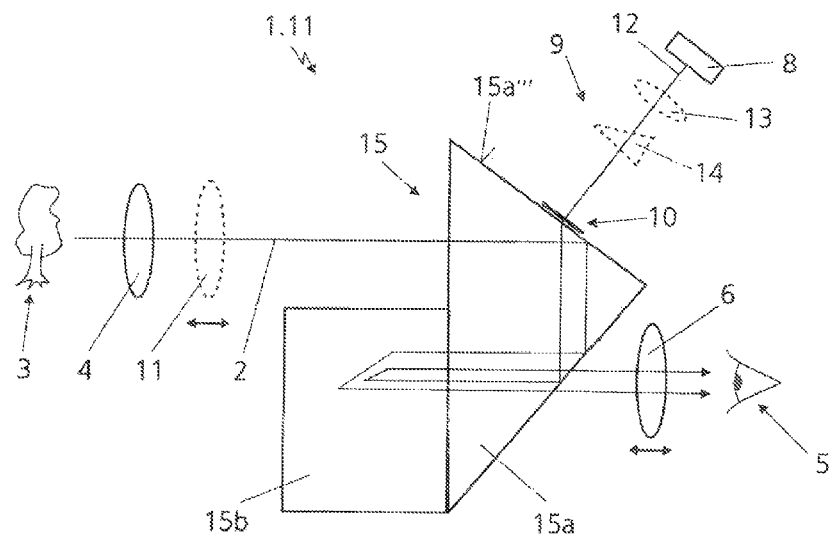
FIG. 11 shows a schematic of a eleventh embodiment of an inventive optical observation device.

FIG. 10 shows a tenth embodiment of an inventive optical observation device 1.10, and FIG. 11 shows an eleventh embodiment of an inventive optical observation device 1.11. In this case, a further face 15a''' of the first prism 15a is respectively provided with the holographic layer 10.

Figure 12:
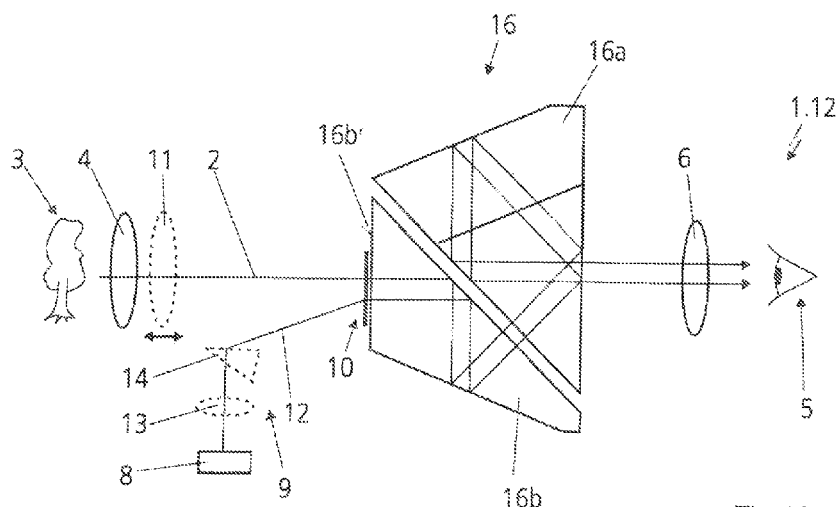
FIG. 12 shows a schematic of a twelfth embodiment of an inventive optical observation device.
Figure 13:
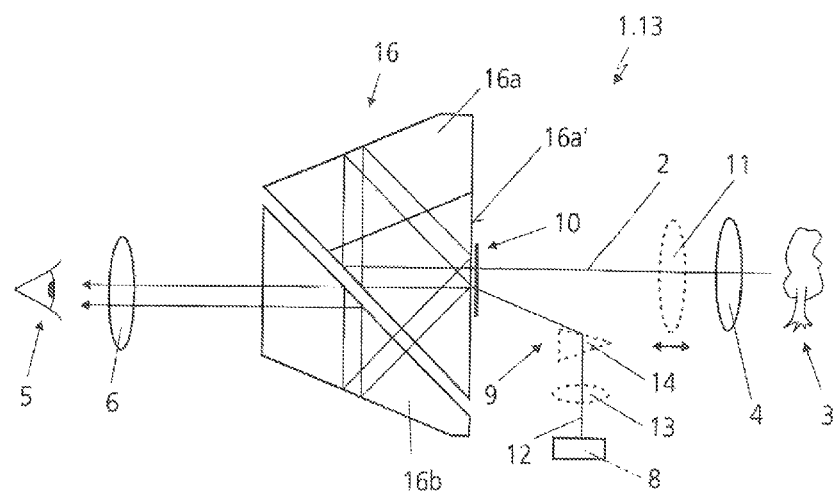
FIG. 13 shows a schematic of a thirteenth embodiment of an inventive optical observation device.

FIG. 12 shows a twelfth embodiment of an inventive optical observation device 1.12, and FIG. 13 shows a thirteenth embodiment of an inventive optical observation device 1.13. In this case, a Schmidt Pechan prism system 16 is respectively provided as inverted system with a roof prism 16a and a further prism 16b. A light entrance face (16b') of the further prism (16b) of the Schmidt Pechan prism system (16) is provided in FIG. 12, and in FIG. 13 a light entrance face (16a') of the roof prism (16a) of the Schmidt Pechan prism system (16) is provided with the holographic layer (10) for the observation light.

If required, further optical elements, for example for enlarging or reducing the imaging, can be integrated. In other exemplary embodiments, the inverting systems 7, 15, 16 can also be installed in the beam path of a telescope or binoculars instead of the customary inverting system, and so their display then appears superposed in the observation image of the observation device.

The beam paths 2 and 12, respectively, are illustrated greatly simplified in FIGS. 1 to 13.

Figure 14:
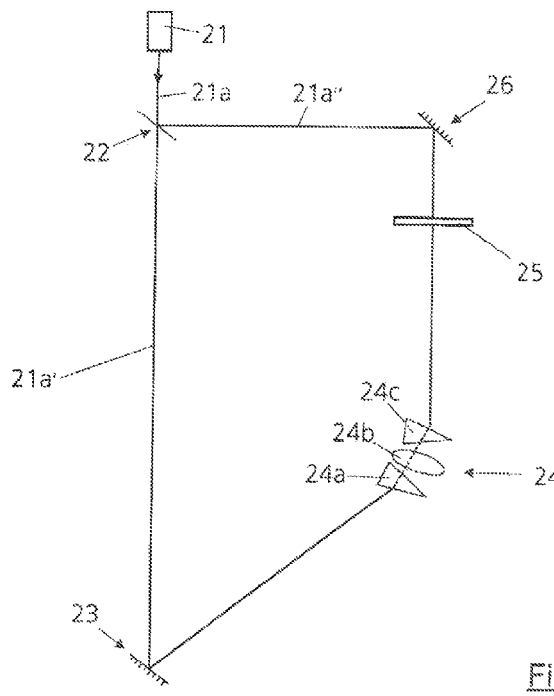
FIG. 14 shows a simplified schematic of a production method for a holographic optical element for use in an inventive optical observation device.

A production method for the holographic optical element 10 is illustrated in a simplified fashion in FIG. 14. As may be seen from FIG. 14, use is made of a laser 21 with the same wavelength as the light of the display device 8 later employed. The light 21a of the laser is split with the aid of a beam splitter 22. A first component beam 21a' of the laser light 21a is subsequently deflected by a mirror 23 and passes through an optics 24 that forms the basis of the holographic optical element 10. The optics in this case has a prism 24a, an optional collimator lens or imaging lens 24b that images the display into an image plane, and an optional further prism 24c, which can take account of the installation angle of the display device 8. Thereafter, the component beam 21a' is directed onto a photosensitive layer 25 (for example silver salts on glass). The second component beam 21a" of the laser light 21a is likewise reflected at a mirror 26 and then falls from the rear onto the photosensitive layer 25. The photosensitive layer 25 is exposed to the two component beams 21a', 21a". The holographic optical element 10 is finished after non-exposed silver salts have been washed out.

LIST OF REFERENCE SYMBOLS 1.1-1.11 Optical observation device
2 Visual observation beam path
3 Target object
4 Objective lens
5 Eye of an observer
6 Eyepiece
7 Abbe König prism system
7a Roof prism
7a' Face of the roof prism
7a" Light entrance face of the roof prism
7b Isosceles prism
7b' Face of the isosceles prism
7b" Light entrance face of the isosceles prism
8 Display device
9 Device
10 Holographic optical element
11 Focus unit
12 Light to be superposed
13, 24b Optional imaging lens/collimator lens
14, 24c Optional further prism
15 Porro prism system
15a $1^{st}$ prism of the Porro prism system
15b $2^{nd}$ prism of the Porro prism system
15a' Light exit face of the $1^{st}$ prism
15a" Light entrance face of the $1^{st}$ prism
15a''' Further face of the $1^{st}$ prism
16 Schmidt Pechan prism system
16a Roof prism of the Schmidt Pechan prism system
16b Further prism of the Schmidt Pechan prism system
16a' Light entrance face of the roof prism
16b' Light entrance face of the further prism
21 Laser
21a Laser light
21a' $1^{st}$ component beam of the laser light
21a" $2^{nd}$ component beam of the laser light 22 Beam splitter
23 Mirror
24 Optics
24a Prism
25 Photosensitive layer
26 Mirror While the invention has been described with reference to various preferred embodiments, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A telescope with at least one visual observation beam path, comprising:
    an objective lens, that is to be turned in an operating position to a target object to be observed and images the target object;
    an eyepiece to be turned to an eye of an observer;
    a Schmidt Pechan prism system, arranged in the at least one visual observation beam path between the objective lens and the eyepiece, for image inversion of the at least one visual observation beam path;
    a display device for displaying an additional image in the at least one visual observation beam path to the observer; and
    at least one device for image superposition, which has at least one holographic optical element, and which uses the at least one holographic optical element to superpose onto the image of the display device the image of the target object to be observed in an intermediate image plane of the at least one visual observation beam path, wherein the Schmidt Pechan prism system is provided with the at least one holographic optical element of the at least one device for image superposition, wherein the at least one holographic optical element effects a deflection of light, which is to be superposed, of the display device in the at least one visual observation beam path, wherein the at least one holographic optical element is a transmitting element for the light of the display device and for observation light of the target object, wherein the at least one holographic optical element is arranged at a face of the Schmidt Pechan prism system, the face being a light entrance face directed to the target object or a light exit face directed to the eyepiece, and
wherein the light of the display device and the observation light of the target object initially enter the at least one holographic optical element from a same side of the at least one holographic optical element, the same side of the at least one holographic optical element being directed towards the target object.

2. The telescope according to claim 1, wherein the at least one holographic optical element additionally effects an imaging, a collimation and/or a wavelength section of the light, which is to be superposed, of the display device.

3. The telescope according to claim 1, wherein the at least one holographic optical element is applied as a holographic layer to the face of the Schmidt Pechan prism system.

4. The telescope according to claim 3, wherein the face is a face of a roof prism of the Schmidt Pechan prism system or a face of a further prism of the Schmidt Pechan prism system.

5. The telescope according to claim 4, wherein the roof prism or the further prism of the Schmidt Pechan prism system is directed to the target object, and wherein the face is a light entrance face of the roof prism or of the further prism of the Schmidt Pechan prism system for the observation light.

6. The telescope according claim 4, wherein the at least one holographic optical element is arranged on one side of a particular one of the prisms, wherein the one side has an outer surface and an inner surface, wherein the at least one holographic optical element is arranged at the outer surface, wherein the light of the display device transmits through the at least one holographic optical element and the one side of the particular prism into the particular prism, and wherein the observation light of the target object is reflected by the inner surface of the one side of the particular prism.

7. The telescope according to claim 1, wherein the at least one holographic optical element is at least one transmission diffraction grating.

8. The telescope according to claim 1, wherein the at least one holographic optical element is at least one diffractive optical element.

9. The telescope according to claim 1, wherein the at least one holographic optical element is arranged at the light entrance face that is directed to the target object.

10. The telescope according to claim 1, wherein the at least one holographic optical element is arranged at the light exit face that is directed to the eyepiece.

11. A telescope with at least one visual observation beam path, comprising:
    an objective lens, that is to be turned in an operating position to a target object to be observed and images the target object;
    an eyepiece to be turned to an eye of an observer;
    an Abbe König prism system or a Porro prism system, arranged in the at least one visual observation beam path between the objective lens and the eyepiece, for image inversion of the at least one visual observation beam path;
    a display device for displaying an additional image in the at least one visual observation beam path to the observer; and
    at least one device for image superposition, which has at least one holographic optical element, and which uses the at least one holographic optical element to superpose onto the image of the display device the image of the target object to be observed in an intermediate image plane of the at least one visual observation beam path, wherein the Abbe König prism system or the Porro prism system is provided with the at least one holographic optical element of the at least one device for image superposition, wherein the at least one holographic optical element effects a deflection of light, which is to be superposed, of the display device in the at least one visual observation beam path, wherein the at least one holographic optical element is a transmitting element for the light of the display device and for observation light of the target object, wherein the at least one holographic optical element is arranged at a face of the Abbe König prism system or the Porro prism system, the face being a light entrance face directed to the target object or a light exit face directed to the eyepiece, and wherein the light of the display device and the observation light of the target object initially enter the at least one holographic optical element from a same side of the at least one holographic optical element, the same side of the at least one holographic optical element being directed towards the target object.

12. The telescope according to claim 11, wherein the at least one holographic optical element is arranged at the light entrance face that is directed to the target object.

13. The telescope according to claim 11, wherein the at least one holographic optical element is arranged at the light exit face that is directed to the eyepiece.

14. The telescope according to claim 11, wherein the at least one holographic optical element additionally effects an imaging, a collimation and/or a wavelength section of the light, which is to be superposed, of the display device.

15. The telescope according to claim 11, wherein the at least one holographic optical element is applied as a holographic layer to the face of the Abbe König prism system or the Porro prism system.

16. The telescope according to claim 15, wherein the face is a face of a prism of the Abbe König prism system or the Porro prism system.

17. The telescope according to claim 16, wherein the prism of the Abbe König prism system or the Porro prism system is directed to the target object, and wherein the face is a light entrance face of the prism of the Abbe König prism system or the Porro prism system for the observation light.

18. The telescope according to claim 16, wherein the at least one holographic optical element is arranged on one side of the prism, wherein the one side has an outer surface and an inner surface, wherein the at least one holographic optical element is arranged at the outer surface, wherein light of the display device transmits through the at least one holographic optical element and the one side of the prism into the prism, and wherein the observation light of the target object is reflected by the inner surface of the one side of the prism.

19. The telescope according to claim 11, wherein the at least one holographic optical element is at least one diffractive optical element.

20. The telescope according to claim 11, wherein the at least one holographic optical element is at least one transmission diffraction grating.

* * * * *